Oct. 30, 1923.
A. H. WILSON
CLUTCH
Filed Oct. 19, 1921
1,472,710
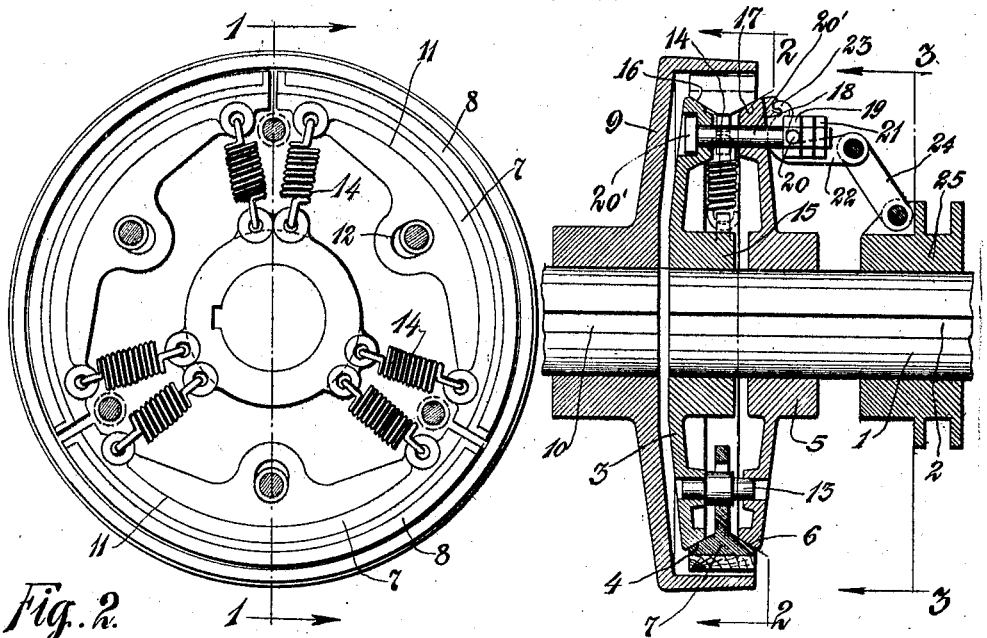
Fig.1.
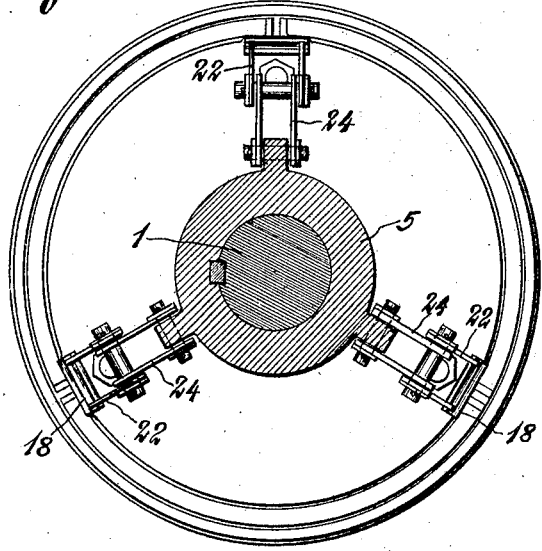
Fig.2.
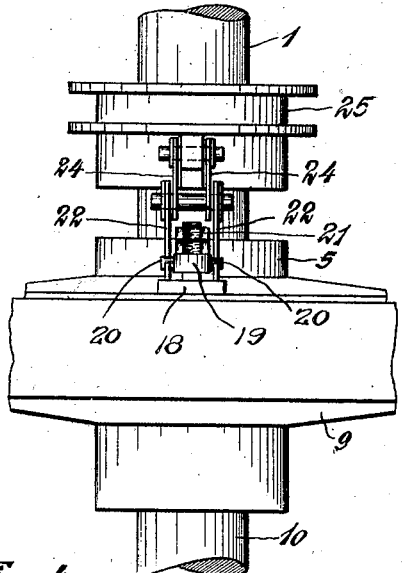
Fig.3. Fig.4.
INVENTOR
A. H. Wilson.
BY
ATTORNEYS Patented Oct. 30, 1923.

1,472,710

UNITED STATES PATENT OFFICE.

ALEXANDER H. WILSON, OF CHICAGO, ILLINOIS.

CLUTCH.

Application filed October 19, 1921. Serial No. 508,759.

*To all whom it may concern:*

Be it known that I, ALEXANDER H. WILSON, a citizen of the United States, and a resident of Chicago, in the county of Cook and State of Illinois, have invented a new and useful Improvement in Clutches, of which the following is a full, clear, and exact description.

My invention relates to improvements in clutches of the ring expanding type, and it consists in the combinations, constructions, and arrangements herein described and claimed.

An object of my invention is to provide a ring expanding clutch, in which the rotated clutch ring comprises a plurality of sections, each section being adapted to grip the rotatable member of the clutch, thereby providing a clutch which has a greater gripping surface between its two members than the ordinary type of ring expanding clutch.

A further object of my invention is to provide a device of the character described which makes use of centrifugal force in effecting the engagement of the two members of the clutch.

A further object of my invention is to provide a device of the character described which utilizes the greatest amount of leverage possible in expanding the clutching band or ring.

A further object of my invention is to provide a device of the character described which is relatively simple in operation, efficient for the work intended, and is not likely to get out of order easily.

Other objects and advantages will appear in the following specification, and the novel features of the invention will be particularly pointed out in the appended claims.

My invention is illustrated in the accompanying drawings forming part of this application, in which—

Figure 1 is a section along the line 1—1 of Figure 2,

Figure 2 is a section along the line 2—2 of Figure 1,

Figure 3 is a section along the line 3—3 of Figure 1, and

Figure 4 is a plan view of the device.

In carrying out my invention, I provide a shaft 1 which is rotated by any means (not shown). The shaft 1 is provided with a keyway 2 and has rigidly mounted on the end thereof a disk 3. The periphery of the disk 3 is beveled as at 4. A second disk 5 is slidably mounted on the shaft 1 and is keyed thereto, and also has its periphery beveled at 6. A ring expanding clutching member 7 is made up of a plurality of sections 11, three being shown in the present form of the device. Each section is arcuate in shape and carries an arcuate piece of wood 8 or other material of gripping qualities, which is adapted to engage with the interior surface of a female clutch member 9, the latter being carried by a shaft 10 and keyed thereto. Each of the sections 11 has an elongated opening 12 midway therebetween through which a pin 13 carried by the disks 3 and 5 is adapted to pass. The outer ends of the sections 11 are provided with springs 14—14 which in turn are secured to the hub 15 of the disk 3 (see Figures 1 and 2). Each section 11 also has its interior wall fashioned with two diverging surfaces 16 and 17, which are adapted to contact with the beveled peripheries 4 and 6 of the disks 3 and 5, respectively.

It will here be noted that a movement of the disk 5 toward the disk 3 will cause an outward movement of the sections 11, the latter gripping the interior surface of the member 9. To effect this movement, I provide the disk 5 with a plurality of lugs 18 projecting outwardly therefrom, three being shown in the drawings. A collar 19 provided with pins 20, is slipped over a bolt 20′ and is held in place by nuts 21. The bolt 20′ is carried in alined openings of the disks 3 and 5, respectively. The bell-crank levers 22 have their ends 23 loosely mounted in an indentation in the lug 18 and are pivotally secured at their other ends to links 24, the latter being pivotally carried by a slidable collar 25 mounted on the shaft 1. The bell-crank levers 22 engage with the pins 20, and as will be seen will force the disk 5 inwardly when the levers are swung outwardly about their ends 23 as a pivot. I provide three sets of bell-crank levers 22 and links 24, thereby obtaining a uniform pressure in three places on the disk 5 when the collar 25 is moved.

From the foregoing description of the various parts of the device, the operation thereof may be readily understood. The springs 14 are of such a tension as to normally overcome the centrifugal force of the sections 11 when the latter are rotated by the shaft 1. A comparatively easy movement of the collar 25 toward the disk 5 will cause the latter to move toward the disk 3 and to force the sections 11 outwardly and against the interior surface of the member 9, thus effectually gripping the same in a plurality of places. The shaft 10 will thereupon be rotated with the shaft 1. It will also be noted that the sections 11 will move slightly toward the member 9 when they are forced outwardly, and that the surfaces 16 and 17, which engage the beveled peripheries 4 and 6 of the disks 3 and 5, will ride thereon. The only place of friction is therefore between the surfaces 16 and 4, and the surfaces 17 and 6, respectively. I thus provide a device which will efficiently operate even though the engaging surfaces 16 and 4, and 17 and 6 become slightly worn through use.

I claim:

1. In a clutch mechanism, a shaft, a disc rigidly secured to said shaft and having a tapered periphery, a second disc movable toward said first named disc and having a tapered periphery, whereby the peripheries of said discs form a wedge-shaped groove, a ring comprising a plurality of segments having wedge-shaped inner sides adapted to be received in the wedge-shaped groove of said discs, spring means for yieldingly holding said segments in engagement with said discs, bolts carried by said stationary disc and being slidably received in said movable disc, levers fulcrumed to said bolts and being adapted to move said movable disc toward said stationary disc, and means for actuating said levers.

2. A clutch comprising a rotatable member, a second member adapted to be rotated by said first named member, a disc rigidly secured to said rotatable member, a second disc movable toward and away from said first named disc and being rotated by said rotatable member, the peripheries of said discs being tapered, whereby the tapered peripheries form a wedge-shaped groove, a clutch ring composed of a plurality of sections, each section having a wedge-shaped under surface adapted to be carried by the tapered peripheries of said discs, said sections being adapted to frictionally engage with said second named member, and common means for moving said clutch sections out of engagement with said second named member and for moving said movable disc away from said first named disc.

3. A clutch comprising a rotatable member, a second member adapted to be rotated by said first named member, a disc rigidly secured to said rotatable member, a second disc movable toward and away from said first named disc and being rotated by said rotatable member, the peripheries of said discs being tapered, whereby the tapered peripheries form a wedge-shaped groove, a clutch ring composed of a plurality of sections, each section having a wedge-shaped under surface adapted to be carried by the tapered peripheries of said discs, said sections being adapted to frictionally engage with said second named member, and springs for moving said clutch sections out of engagement with said second named member and for moving said movable disc away from said first named disc.

ALEXANDER H. WILSON.